(12) United States Patent
Macklem-Clements et al.

(10) Patent No.: US 10,853,215 B2
(45) Date of Patent: Dec. 1, 2020

(54) INTELLIGENT CONFIGURATION MANAGEMENT OF USER DEVICES

(71) Applicant: Microsoft Technology Licensing, LLC, Redmond, WA (US)

(72) Inventors: Loretta M. Macklem-Clements, Redmond, WA (US); Deepam Dubey, Issaquah, WA (US); Ramasubramanian Shastri, Redmond, WA (US); David C. James, Snohomish, WA (US); Prabagar Ramadasse, Sammamish, WA (US); Brett D. A. Flegg, Redmond, WA (US); Anton M. Varshavskiy, Redmond, WA (US); Maayan Bar-Niv, Raanana (IL); Fernando J. Sanchez Gonzalez, Seattle, WA (US); Aniket M. Sapre, Redmond, WA (US); Charles B. Kilpatrick, Bellevue, WA (US); Chung-Wei Foong, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 16/405,929

(22) Filed: May 7, 2019

(65) Prior Publication Data
US 2020/0081812 A1    Mar. 12, 2020

Related U.S. Application Data

(60) Provisional application No. 62/729,351, filed on Sep. 10, 2018.

(51) Int. Cl.
*G06F 15/177*    (2006.01)
*G06F 11/30*    (2006.01)
(Continued)

(52) U.S. Cl.
CPC ........ *G06F 11/302* (2013.01); *G06F 11/0709* (2013.01); *G06F 11/0754* (2013.01);
(Continued)

(58) Field of Classification Search
None
See application file for complete search history.

(56) References Cited

U.S. PATENT DOCUMENTS

| 2011/0153540 A1 | 6/2011 | Beg et al. |
| 2014/0081925 A1 | 3/2014 | Haeberle et al. |

(Continued)

OTHER PUBLICATIONS

"International Search Report and Written Opinion Issued in PCT Application No. PCT/US19/038848", dated Sep. 20, 2019, 13 Pages.

*Primary Examiner* — Phuoc H Nguyen (57) ABSTRACT

A solution is disclosed for intelligent configuration management of user devices that includes: receiving application performance data for a plurality of applications from each of a first plurality of tenant environments or cloud services or both, the application performance data including a program ID for at least one application of the plurality of applications; receiving incident alerts related to the first program ID from each of a second plurality of tenant environments; based at least on receiving the incident alerts, determining whether a count of the second plurality of tenant environments meets a threshold; and based at least on the count of the second plurality of tenant environments meeting the threshold, requesting incident reports related to the program ID from each of a third plurality of tenant environments, wherein the third plurality of tenant environments has a smaller count than the count of the second plurality of tenant environments.

20 Claims, 8 Drawing Sheets

(51) Int. Cl.
*G06F 11/34* (2006.01)
*G06F 11/07* (2006.01)
*H04L 12/24* (2006.01)
*H04L 29/08* (2006.01)

(52) U.S. Cl.
CPC ...... *G06F 11/0772* (2013.01); *G06F 11/3006* (2013.01); *G06F 11/3466* (2013.01); *H04L 41/0631* (2013.01); *H04L 41/0816* (2013.01); *H04L 67/36* (2013.01)

(56) References Cited

U.S. PATENT DOCUMENTS

| | | |
|---|---|---|
| 2017/0091009 A1 | 3/2017 | Bhattacharyya et al. |
| 2017/0204111 A1* | 7/2017 | Kaplan ................ C07D 261/08 |
| 2019/0374839 A1* | 12/2019 | Wanke ............... G06Q 30/0245 |
| 2020/0184278 A1* | 6/2020 | Zadeh .................. G06F 16/953 |

* cited by examiner

INTELLIGENT CONFIGURATION MANAGEMENT OF USER DEVICES

CROSS-REFERENCE TO RELATED APPLICATION

This application claims the benefit of U.S. Provisional Patent Application No. 62/729,351, filed Sep. 10, 2018, entitled "Determining the Compatibility of Applications With an Operating System Update", the entirety of which is hereby incorporated by reference herein.

BACKGROUND

Information technology (IT) administrators collect data about applications that are running on user devices (e.g., personal computers (PCs), notebook PCs, and other computing devices) within the tenant environment managed by the respective IT administrators. However, the data collections can be siloed in some environments, limiting the utility for configuration management of user devices. Additionally, some data collections lack the level of depth needed to more fully support configuration management of user devices.

SUMMARY

The disclosed examples are described in detail below with reference to the accompanying drawing figures listed below. The following summary is provided to illustrate some examples disclosed herein. It is not meant, however, to limit all examples to any particular configuration or sequence of operations.

Some aspects disclosed herein are directed to a solution for intelligent configuration management of user devices that includes: receiving application performance data for a plurality of applications from each of a first plurality of tenant environments or cloud services or both, wherein the application performance data includes a program ID for at least one application of the plurality of applications; receiving incident alerts related to the first program ID from each of a second plurality of tenant environments; based at least on receiving the incident alerts related to the program ID, determining whether a count of the second plurality of tenant environments meets a threshold; based at least on the count of the second plurality of tenant environments meeting the threshold, requesting incident reports related to the program ID from each of a third plurality of tenant environments, wherein the third plurality of tenant environments has a smaller count than the count of the second plurality of tenant environments; and generating an incident assessment for the first program ID.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

The various examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Aspects of the disclosure provide intelligent configuration management of user devices. Application performance data for a plurality of applications is received from each of a first plurality of tenant environments. The application performance data includes a program ID for at least one application of the plurality of applications. Incident alerts related to the first program ID are received from each of a second plurality of tenant environments. Based at least on receiving the incident alerts related to the program ID, a count of the second plurality of tenant environments is compared to a threshold. Based at least on the count of the second plurality of tenant environments meeting the threshold, incident reports related to the program ID are requested from each of a third plurality of tenant environments. The third plurality of tenant environments has a smaller count than the count of the second plurality of tenant environments. Aspects of the disclosure leverage asset intelligence (AI).

Aspects of the disclosure operate in an unconventional way to improve configuration management by capturing intent data and combining it with rich data collected by new and existing tools. For example, application health data is collected; however, not all user devices send detailed crash reports. This reduces network burdens. Additionally, some cross-tenant data is made available to IT administrators to improve update and maintenance operations. An example uses components running on user devices, IT administrator nodes, and multiple cloud services.

Figure 1:
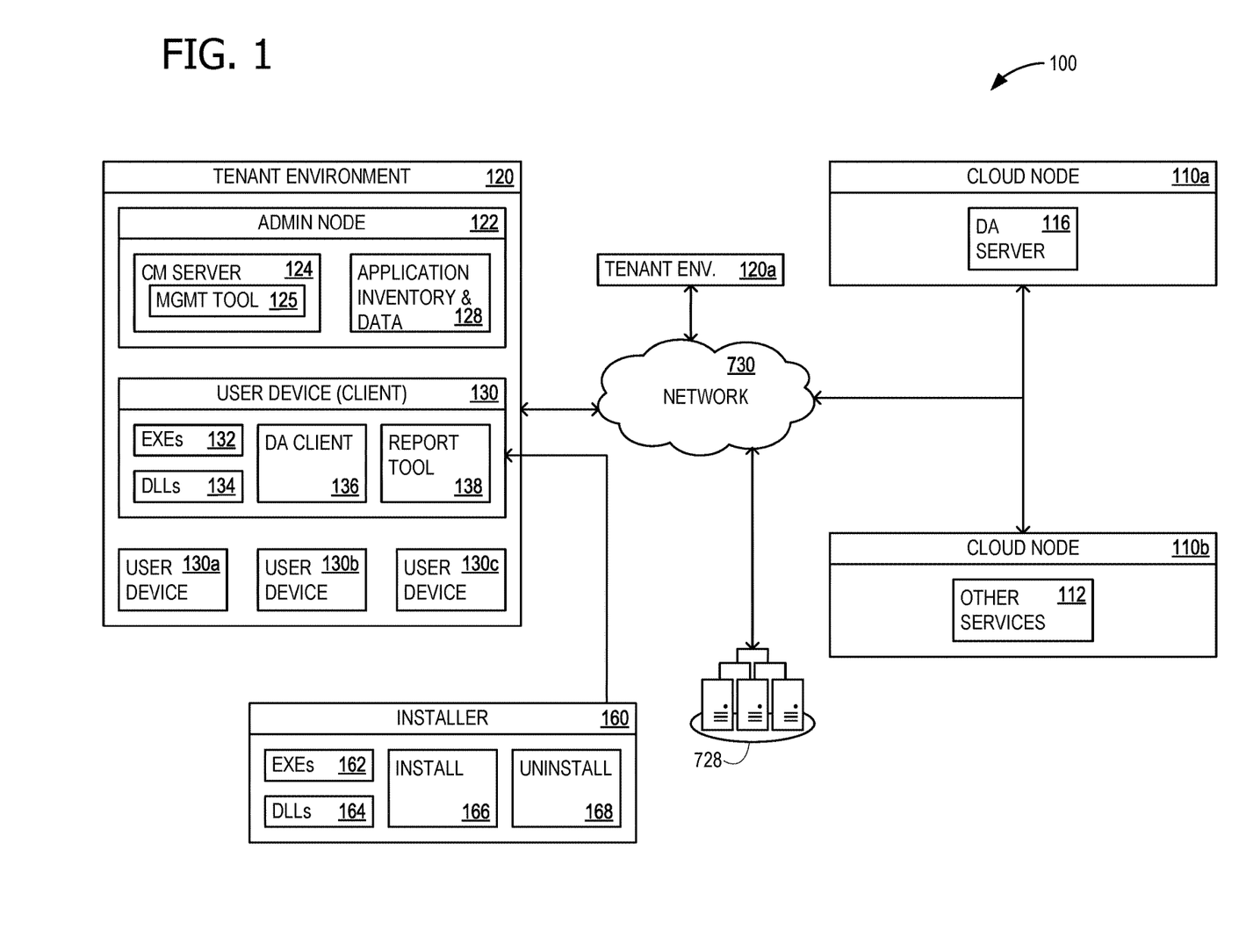
FIG. 1 illustrates an environment that advantageously employs a tool for intelligent configuration management of user devices.

FIG. 1 illustrates an environment 100 that advantageously employs a tool for intelligent configuration management of user devices. A tenant environment 120 includes an administrator node 122 and a plurality of user devices 130, 130a, 130b, and 130c. In some examples, some or all of administrator node 122 and user devices 130, 130a, 130b, and 130c are examples of computing device 700, which is described in more detail in relation to FIG. 7. As illustrated, environment 100 also includes another tenant environment 120a, cloud nodes 110a and 110b, and cloud resource 728. In some examples, tenant environment 120a includes an equivalent set of components as tenant environment 120. In some examples, cloud nodes 110a and 110b are equivalent to cloud resource 728 (which is also described in more detail in relation to FIG. 7), and include one or more examples of computing device 700. Tenant environment 120 and tenant environment 120a are each connected to cloud nodes 110a and 110b and cloud resource 728 via network 730.

Administrator node 122 includes, for example, a configuration manager (CM) server 124 and an application inventory and data 128. CM server 124 is a systems management software product that is suitable for managing large groups of computers running various operating systems (OSs). Some examples of CM server 124 provide remote control, patch management, software distribution, operating system deployment, network access protection, and hardware and software inventory functions. A CM management tool 125 permits IT administrators to model complicated applications and deploy them to user devices 130, and 130a-130c. An example CM server 124 includes a Systems Center Configuration Manager (SCCM) server.

User device 130 runs an OS such as WINDOWS®, ANDROID®, LINUX®, MACOS®, or another OS, and includes a binary executable files of the type exe in a set of EXEs 132 and dynamic link library (dll) files in a set of DLLs 134. Together, set of EXEs 132 and set of DLLs 134 comprise a plurality of applications that execute on user device 130. See FIG. 5 and its description for additional information regarding the relationship between exe files, dll files, and applications. An installer 160 (e.g., MSI, formerly MICROSOFT® Installer) is an installer package that installs a set of EXEs 162 and a set of DLLs 164 onto user device 130, and includes install functionality 166 and uninstall functionality 168. Installer 160 provides information to application inventory and data 128 for use by CM server 124. In some examples, a program ID for a newly installed application is mapped to any prior applications with the same program ID that have already been modeled by CM management tool 125. These applications contain detection, installation, and deployment information. CM management tool 125 can then take actions based on the alerts related to the program ID, even for the newly installed application, thereby assisting the IT administrator.

A desktop analytics (DA) client 136 runs on user device 130 and interfaces with a DA server 116 running in cloud node 110a. DA client 136 captures information about applications running on user device 130, such as whether there are crashes or whether the applications are running smoothly. A report tool 138 (e.g., WATSON™) runs on user device 130 and collects crash data suitable for diagnostic tasks. An "other services" server 112 runs on cloud node 110b. Other services server 112 can provide, for example security services, such as capturing information about executable and dll files running on user device 130 and detecting which may be vulnerable to various threats.

Figure 2:
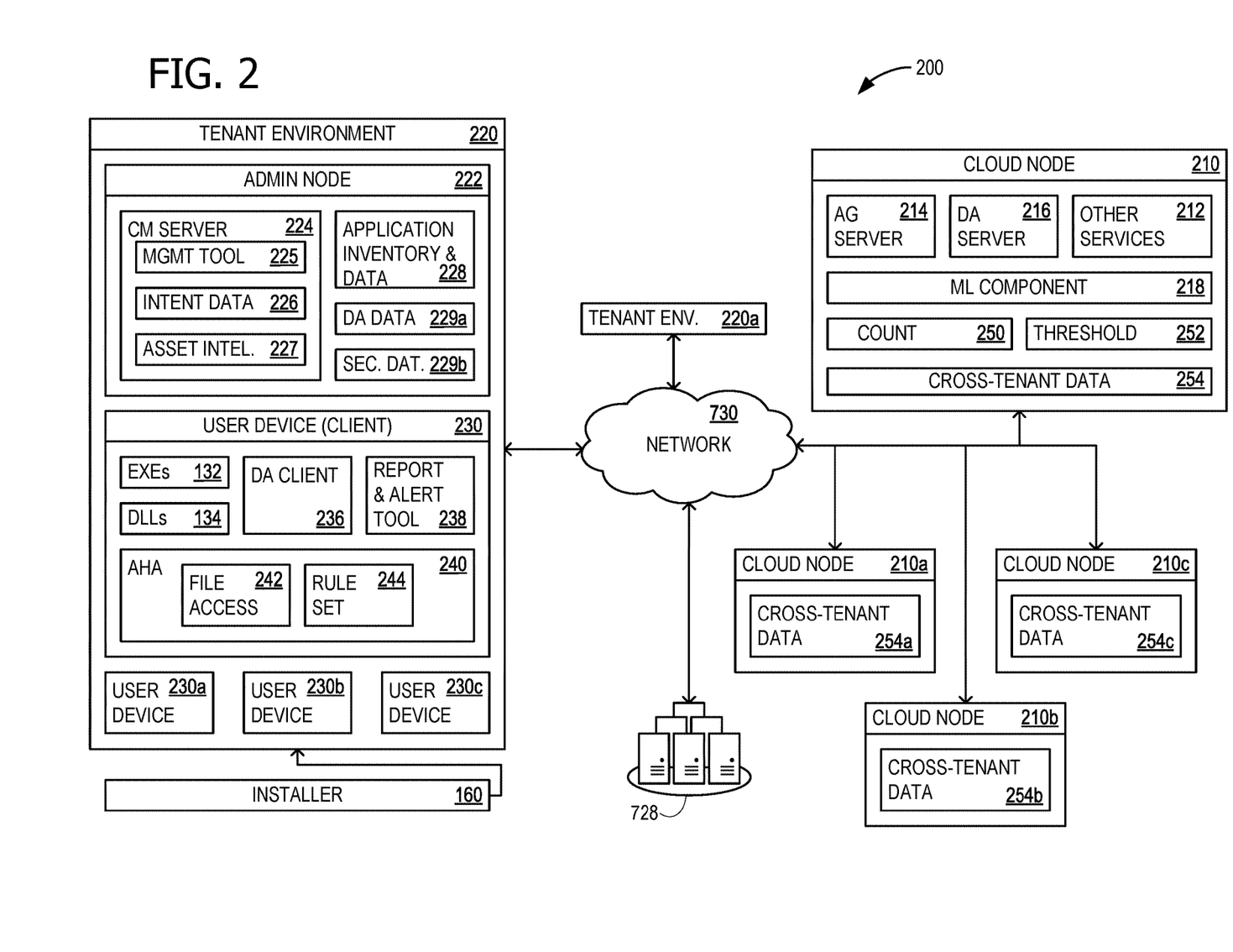
FIG. 2 illustrates an exemplary environment for intelligent configuration management of user devices.

FIG. 2 illustrates an exemplary environment 200 for intelligent configuration management of user devices. Environment 200 includes a tenant environment 220, a tenant environment 220a, cloud nodes 210, 210a, 210b, and 210c, and cloud resource 728, connected via network 730. Tenant environment 220 and tenant environment 220a are similar to tenant environment 120, although include additional functionality as described herein. Similarly, cloud nodes 210, 210a, 210b, and 210c are similar to cloud nodes 110a and 110b, although also include additional cloud services functionality as described herein. In some examples, cloud nodes 210, 210a, 210b, and 210c are server nodes providing cloud services. Within tenant environment 220, administrator node 222 and user devices 230, 230a, 230b, and 230c are similar to administrator node 122 and user devices 130-130c, respectively, although include additional functionality as described herein. Any of user devices 230-230c and cloud nodes 210-210c are examples of computing device 700 (of FIG. 7).

A CM server 224 includes a CM management tool 125 that includes the functionality of CM management tool 125, and further permits IT administrators to request data related to various applications from cloud node 210. Using CM management tool 225, IT administrators enter information regarding applications desired to be installed on user device 230 into intent data 226 to request data related to various applications from cloud node 210. Examples of intent data 226 include information related to issues such as Intent data would be items such as: (1) Is this application deployed because it is required on the device or instead because it is available (optional)? This status can affect options in the event that there is an issue with the application. (2) Has the IT administrator deployed an uninstall command for the application? This indicates that the application should not be on the device. (3) What are the dependencies? Some dependencies can be detected by monitoring/investigating the applications files, whereas some other dependencies become detectable when an IT administrator links two applications together in CM management tool 125 and marks them as having a dependency relationship. (4) Is the IT administrator planning to replace application V1 with application V2?

An AI component 227 (asset intelligence, rather than artificial intelligence, herein) collects information about applications installed on user device 230 and identified application inventory and data 228. IT administrators may also enter searchable experience information into identified application inventory and data 228 via CM management tool 225. In some examples, some of this searchable experience information is sent to cloud node 210 upon a query from cloud node 210, and thus may be included in cross-tenant data 254. That is, DA data 229a and security service data 229b are stored on administrator node 222, awaiting query by cloud node 210. CM server 224 presents a set of reports to IT administrators that identify applications installed on user devices 230-230c. CM server 224, is able to integrate data together, such as vulnerability data, upgrade compatibility data, and administrator intent for an application, that was previously siloed.

A DA client 236 provides any legacy functionality of DA client 136, while also interfacing with the improved versions of CM server 224 and a DA server 216 on cloud node 210. A report and alert tool 238 generates alerts when an application crashes, sends incident alerts to an application graph (AG) server 214 on cloud node 210 and waits for a request from AG server 214 for incident reports before sending more detailed incident reports. The incident alerts related include application crash alerts, and the incident reports include application crash reports that include diagnostic data. If report and alert tool 238 does not receive a request for an incident report, report and alert tool 238 does not send an incident report, saving network resources.

In many scenarios today, there is a need for IT administrators to understand the usage implications of various binary executable files, such as compatibility and vulnerability issues, as well as resolution options when a problem occurs or is anticipated. For example, if an OS upgrade is anticipated, IT administrators may wish to preview compatibility issues, so that potentially incompatible binary files are replaced ahead of the upgrade. In some scenarios, the tenant environment 220 may have multiple versions of application binary files, some of which are compatible with an anticipated OS upgrade, and some of which are incompatible. With the operations described herein for CM server 224 and the various other components running in tenant environment 220, IT administrators are both alerted to the incompatibility, and further informed that suitable replacement application binary files are already present and available within tenant environment 220.

Together, CM server 224, DA client 236 with DA server 216, and other services (e.g., other services server 212) identify a binary executable file and alert to potential problems. For example, payload information for DA client 236 and/or DA server 216 indicates compatibility; payload information for other services server 212 holds information related to that other service (e.g., an indication whether a binary executable file may contain malware or a vulnerability for a security service); and CM server 224 leverages a software library to capture which instances of installer 160 contain which files and create a binary to application mapping. Some examples of CM server 224 also add insight into versions and dependencies of application files. In an example operation, AG server 214 communicates with CM server 224 to identify that tenant environment 230 has a particular version of a binary file. AG server 214 inquires of DA server 216 or one of cloud nodes 210a-210c whether that particular version of the binary file operates properly with the planned OS. For example, other tenant environments may have upgraded to the newer OS already, and placed application performance data for a plurality of applications into cross-tenant data 254a, 254b, or 254c, or elsewhere that is accessible by DA server 216. Thus, cloud node 210 is able to receive application performance data for a plurality of applications from each the cloud services provided by cloud nodes 210a, 210b, and 210c, in addition to receive application performance data directly from a plurality of tenant environments (as described below in relation to FIG. 3A). If crash reports indicate a compatibility problem, AG server 214 informs CM server 224, which alerts the IT administrators using CM management tool 225. Additionally, AG server 214 informs CM server 224 which binary executable files are compatible, so the IT administrators are provided with a solution.

An application health analyzer (AHA) 240 reduces the need to identify and collect application packages in a common repository for analysis. AHA 240 performs static analyses of already-installed applications directly for compatibility insights, rather than analyzing set of EXEs 162 and set of DLLs 164 in installer 160. After identifying the applications on user device 230, AHA 240 traverses to the install locations of the application from the registry keys and performs deep analysis of all the system binaries. In some examples, AHA 240 calculates a hash function message digest for binary files to use as a program identifier (ID) for at least one application. If the application crashes, user device 230 sends this program ID and an incident alert to AG server 214 on cloud node 210. Cloud node 210 aggregates incident alerts and incident reports from a plurality of tenant environments, to generate cross-tenant data 254 for sharing. In some examples, CM server 224 monitors the output of a plurality of AHAs, wherein each AHAs of the plurality of AHAs operates on a different user device associated with the first tenant environment.

AHA 240 includes a file access application programming interface (API) 242 and an update rule set 244 (e.g., a ruleset associated with an updates to user device 230). AHA 240 is configured to use file access API 242 to determine whether files associated with the execution of applications are installed on user device 230, and to analyze executing of applications, by assessing the information in the files against the rules in the update rule set 265. For each application installed on user device 230, AHA 240 assesses information included in the set of files associated with executing the application against information included in update rule set 244. Some examples rules for update rule set 244 include, for example:

16 Bit Architecture—Applications or components that use 16-bit executables may be incompatible with an updated to the operating system.

Requires Admin Privileges—By default, when users attempt to start an administrative task, the UAC dialog box asks for confirmation before the task proceeds. If the user is not logged in as an administrator, the user must provide administrator credentials to continue with the task. This means that an administrator must provide explicit consent to perform the administrative task. The task runs in the context of the administrative account.

VISUAL BASIC® 6 Dependency—Applications that depend on VISUAL BASIC® 6 and rely on external plugins or libraries may be incompatible with some newer OSs.

OS version Dependency—Determines whether the version of an operating system installed on a user device) may be altered or unavailable for an update to the operating system.

UI Access—Determines whether an application requests access the user interface of a user device. This is used by applications that provide accessibility, remote desktop, screen capture, and UI automation features.

Non DPI Aware—Determines whether a dots per inch (DPI) aware flag is set in an application manifest of an application. If the DPI aware flag is not set, the application might not run properly with some screen resolutions.

JAVA® Dependency—Determines whether applications are JAVA® applications.

Support Statement—Some software providers declare support for certain OS versions.

Driver Dependency—Determines whether any drivers had been installed with an application.

.NET Framework Dependency—Determines whether a specific .NET version is incompatible with an OS.

Silverlight Application—Determines whether an application uses Silverlight.

AG server 214 receives application performance data for a plurality of applications from each of a plurality of tenant environments, wherein the application performance data includes a program ID for at least one application. AG server 214 also receives incident alerts related to the program ID from a subset of the plurality of tenant environments. AG server 214 counts the number of tenant environments providing incident reports and saves count 250. Based at least on receiving the incident alerts related to the program ID, AG server 214 determines whether count 250 meets a threshold 252. If so, AG server 214 requests more detailed incident reports related to the program ID from a subset of the tenant environments that submitted an incident alert.

In some examples, AG server 214 requests performance data from a tenant environment that had not submitted an incident alert. This includes, for example, data that is not available to the tenant environments that have submitted an incident alert. For example, AG server 214 receives vulnerability data about the program ID from a cloud service other than a tenant that has submitted an incident alert. Alternatively or in addition, AG server 214 receives data describing a category associated with the program ID. Example categories include productivity, documentation, entertainment, and the like. Other examples of performance data received from tenant environments that have not submitted an incident alert include information describing whether the program ID has a modern version available (e.g., in an app store).

Figure 3A:
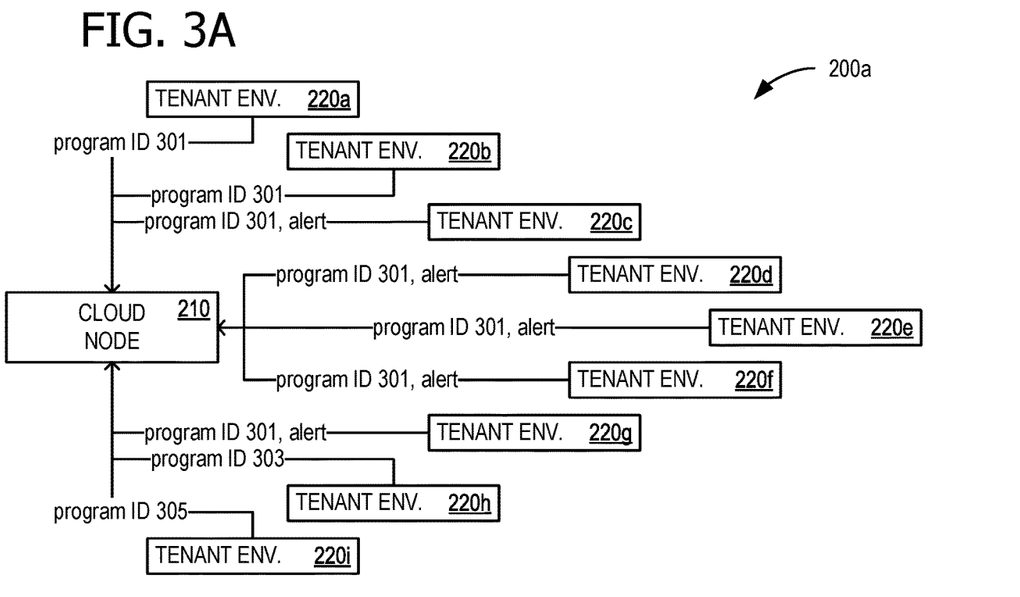
FIG. 3A shows exemplary data flow for intelligent configuration management of user devices.
Figure 3B:
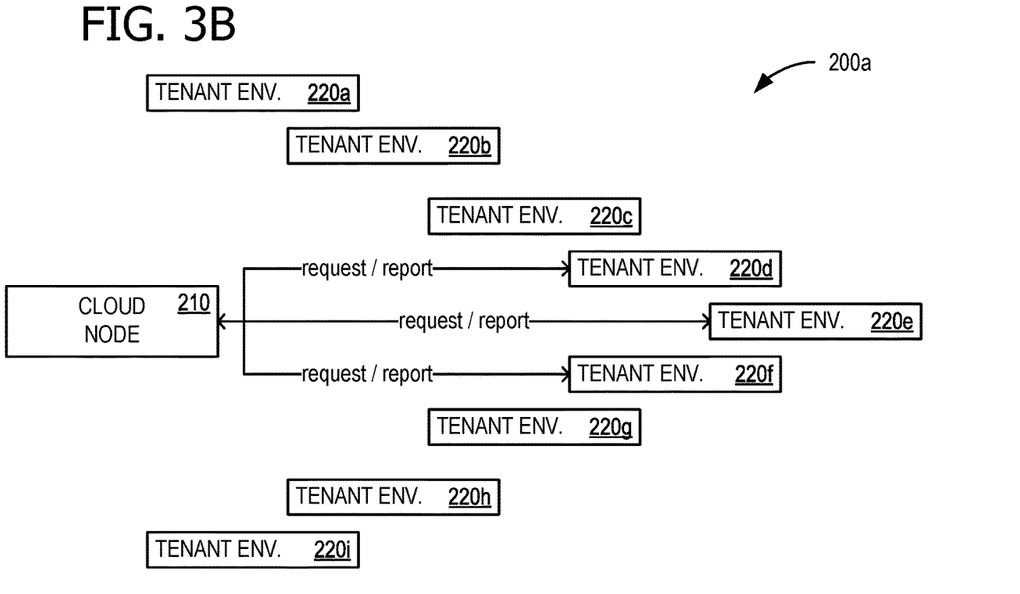
FIG. 3B shows additional exemplary data flow for intelligent configuration management of user devices.

FIGS. 3A and 3B shows exemplary data flow for intelligent configuration management of user devices in an exemplary environment 200a, specifically the data flow associated with incident alerts and incident reports. Environment 200a is an example of environment 200 of FIG. 2, and FIGS. 3A and 3B should be viewed together with FIG. 2. Each of tenant environments 220a-220i is similar to tenant environments 220, and has its own version of AHA 240. In FIG. 3A, AG server on cloud node 210 receives application performance data for a plurality of applications from each of an initial plurality of tenant environments 220a-220g. Thus, cloud node 210 is able to receive application performance data for a plurality of applications from initial plurality of tenant environments 220a-220g or cloud services provided by cloud nodes 210a, 210b, and 210c, or both. The initial plurality includes a first plurality of seven tenant environments 220a-220g providing performance data for an application identified by program ID 301. The initial plurality also includes tenant environment 220h providing performance data for an application identified by program ID 303, and tenant environment 220i providing performance data for an application identified by program ID 305. The application performance data includes a first program ID (program ID 301) for at least one application of the plurality of applications.

AG server on cloud node 210 receives incident alerts related to the first program ID (program ID 301) from each of a second plurality of tenant environments 220c-220g. The first plurality has seven tenant environments, and the second plurality has five tenant environments. Thus, count 250 is set to five. Each program ID has its own count value. Based at least on receiving the incident alerts related to the program ID 301, AG server 214 determines whether count 250 meets threshold 252. In this explanatory example, threshold 252 is five, and so count 250 does meet threshold 252.

As shown in FIG. 3B, based at least on count 250 meeting threshold 252, AG server 214 request incident reports related to program ID 301 from each of a third plurality of tenant environments 220d-220f. The third plurality of tenant environments has a smaller count (three, in this example) than the count of the second plurality of tenant environments (five, in this example). In some examples, the third plurality of tenant environments is within the second plurality of tenant environments, for example, the set of tenant environments 220d-220f is within the set of tenant environments 220c-220g. In some examples, a machine learning (ML) component 218 determines the value of threshold 252 before remedial action is warranted, and also selects the number of and/or specific ones of tenant environments from which to request detailed incident reports. In some examples, the incident reports include application crash reports that include diagnostic data. Upon receiving a request for an incident report the report tools in each of tenant environments 220d-220f respond by sending the incident reports. Because tenant environments 220c and 220g did not receive a request for an incident report, tenant environments 220c and 220g only sent incident alerts, and did not send any incident reports.

Figure 4A:
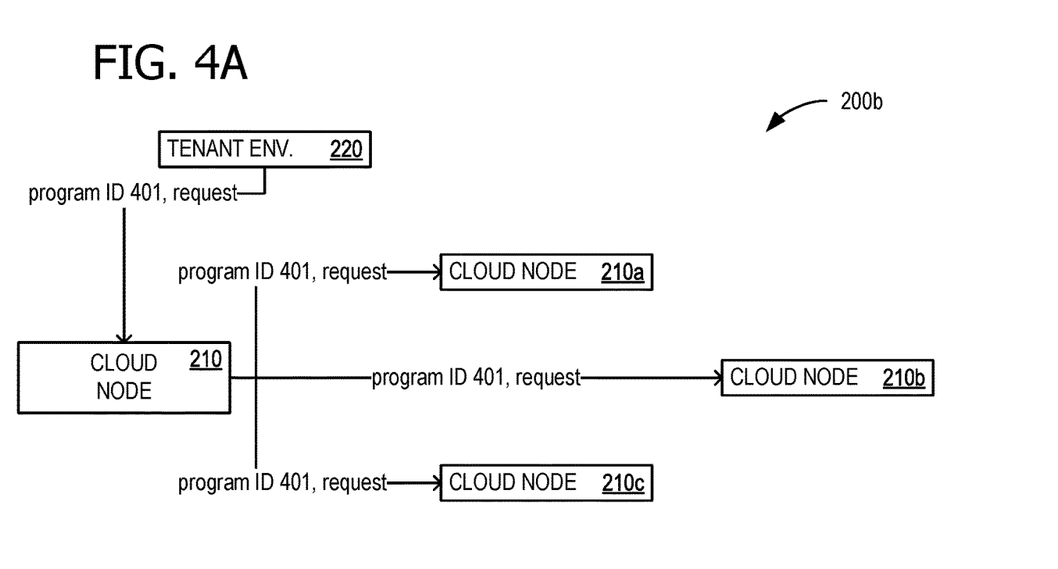
FIG. 4A shows additional exemplary data flow for intelligent configuration management of user devices.
Figure 4B:
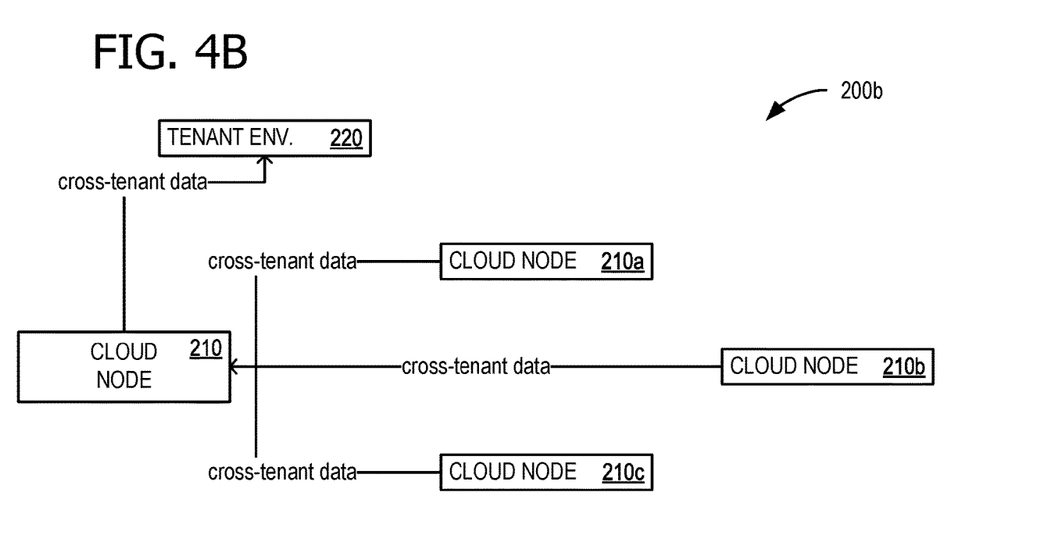
FIG. 4B shows additional exemplary data flow for intelligent configuration management of user devices.

FIGS. 4A and 4B shows exemplary data flow for intelligent configuration management of user devices in exemplary environment 200b, specifically the data flow associated with an IT administrator using CM server 224 to search cloud node 210 for information about one or more applications and/or binary executable files. Environment 200b is an example of environment 200 of FIG. 2, and FIGS. 4A and 4B should be viewed together with FIG. 2. There are multiple types of inquiries for information about one or more applications and/or binary executable files that can be processed, including:

List all applications having updates ready;
List all applications that are compatible with a planned OS upgrade;
List all installed applications that are not compatible with a planned OS upgrade;
List all applications containing malware;
List all applications for which a vulnerability has been identified; and
For a specific application, identify known compatibilities, incompatibilities, and detected malware or vulnerability status.

As shown in FIG. 4A, cloud node 210 receives, from tenant environment 220, a request for data related to at least a second program ID (program ID 401). In some examples, the request for data related to program ID 401 comprises a request for data regarding at least one data set selected from the list consisting of: applications having updates available, application compatibility, application vulnerability, and information specific to the second program ID. Information specific to the second program ID includes, for example, application performance data described above, but for the second program ID. Based at least on receiving the request for data related to program ID 401, cloud node requests, from cloud nodes 210a-210c, at least a portion of the cross-tenant data related to program ID 401. One or more of cloud nodes 210a-210c may have cross-tenant data related to program ID 401 cross tenant data 254a-254c. As shown in FIG. 4B, cloud nodes 210a-210c send what they each have to cloud node 210. Based at least on receiving the request for data related to program ID 401, cloud node 210 transmits, to tenant environment 220, cross-tenant data related to program ID 401.

Aspects of the disclosure obtain in-tenant information to identify problems, and leverage cross-tenant information to solve those problems. Additionally, when an upgrade is planned, it is possible to detect when an application has dependencies that also require upgrades. In some examples, CM server 224 prompts IT administrators to deploy newer versions of binary files as post install steps after an OS upgrade, thus allowing end users to experience no impact during upgrades. In some examples, crowd-sourced data is leveraged to predict compatibility and/or incompatibility. For example, if a large number of other tenants had upgraded their OSs and not suffered any crashes of a particular binary executable file, this may be an indication that the particular binary executable file is compatible with the new OS.

Recapping the descriptions of FIGS. 2-4B, cloud node 210 has a processor 714 and a computer-readable medium (memory 712) storing instructions 712b that are executable by processor 714. (See FIG. 7.) Cloud node 210 receives application performance data for a plurality of applications from each of a first plurality of tenant environments or cloud services or both, wherein the application performance data includes a first program ID for at least one application of the plurality of applications. Cloud node 210 also receives incident alerts related to the first program ID from each of a second plurality of tenant environments. Based at least on receiving the incident alerts related to the first program ID, AG server 214 determines whether the count of the second plurality of tenant environments meets a threshold. Based at least on the count of the second plurality of tenant environments meeting the threshold, AG server 214 requests incident reports related to the first program ID from each of a third plurality of tenant environments, wherein the third plurality of tenant environments has a smaller count than the count of the second plurality of tenant environments. In some examples, the third plurality of tenant environments is within the second plurality of tenant environments. In some examples, the program ID for at least one application comprises at least a portion of a hash function message digest for a binary file. In some examples, the incident alerts related to the first program ID comprise application crash alerts. In some examples, the incident reports related to the first program ID comprise application crash reports that include diagnostic data.

In some examples, cloud node 210 also receives, from a first tenant environment, a request for data related to at least a second program ID. Based at least on receiving the request for data related to at least the second program ID, cloud node 210 transmits, to the first tenant environment, cross-tenant data related to at least the second program ID. In some examples, based at least on receiving the request for data related to the second program ID, cloud node 210 requests, from a second cloud node, at least a portion of the cross-tenant data related to at least the second program ID.

In some examples, administrator node 222 monitors output of a plurality of AHAs, wherein each AHA of the plurality of AHAs operates on a different user device associated with the first tenant environment. In some examples, the request for data related to at least the second program ID comprises a request for data regarding at least one data set selected from the list consisting of: applications having updates available, application compatibility, application vulnerability, and information specific to the second program ID.

Figure 5:
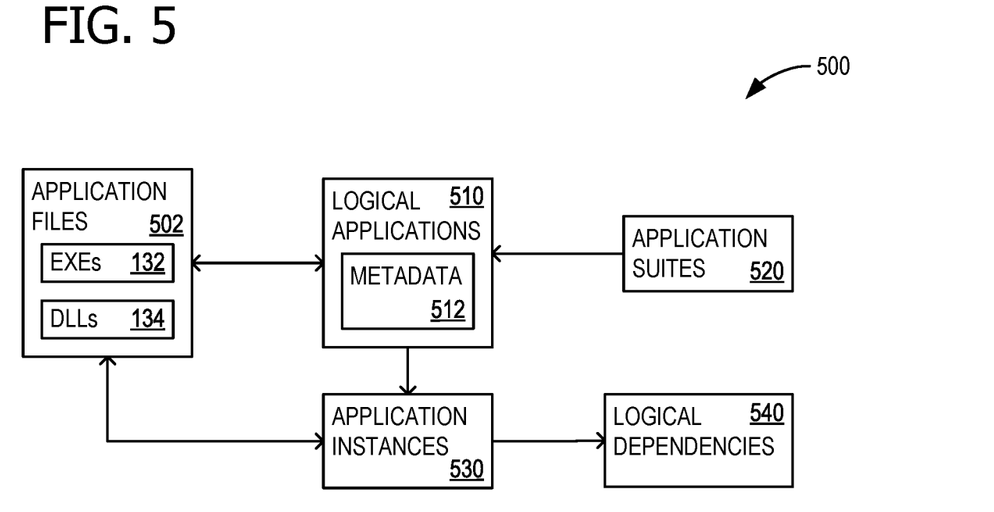
FIG. 5 illustrates a notional hierarchical relationship among executable files and applications.

FIG. 5 is a hierarchical diagram 500 illustrating a notional relationship among executable files and applications. Hierarchical diagram 500 indicates various contexts in which the word "application" can be used, thereby highlighting why various configuration management tools may use different definitions or contexts. In some situations, the definition of "application" varies by context, such as referring to a single binary exe file and its associated dlls, a suite of multiple binary exe files and their associated dlls, and other possible meanings.

A set of application files 502 includes binary executable files of the type exe in set of EXEs 132 and dll files in set of DLLs 134. These map many to many (e.g., "M to N") to a set of logical applications 510. That is, multiple dll files in set of DLLs 134 can each be shared by multiple logical applications within set of logical applications 510, and multiple logical applications in set of logical applications 510 can each share multiple dll files in set of DLLs 134. The overlap in sharing goes in both directions. Each of the logical applications in set of logical applications 510 contains metadata (collectively, metadata 512) that provides end user information, such as name and publisher. A group of application suites 520 also maps to set of logical applications 510. Logical applications 510 and set of application files 502 also map to a set of application instances 530. The mapping of set of application files 502 to application instances 530 is also many to many. Application instances within set of application instances 530 may vary by (1) version, (2) locality, and (3) payload or deployment technology. Scraping set of application instances 530 provides data on logical dependencies 540, which may be used to determine data for management of applications, such as vulnerabilities and readiness for upgrade.

Figure 6A:
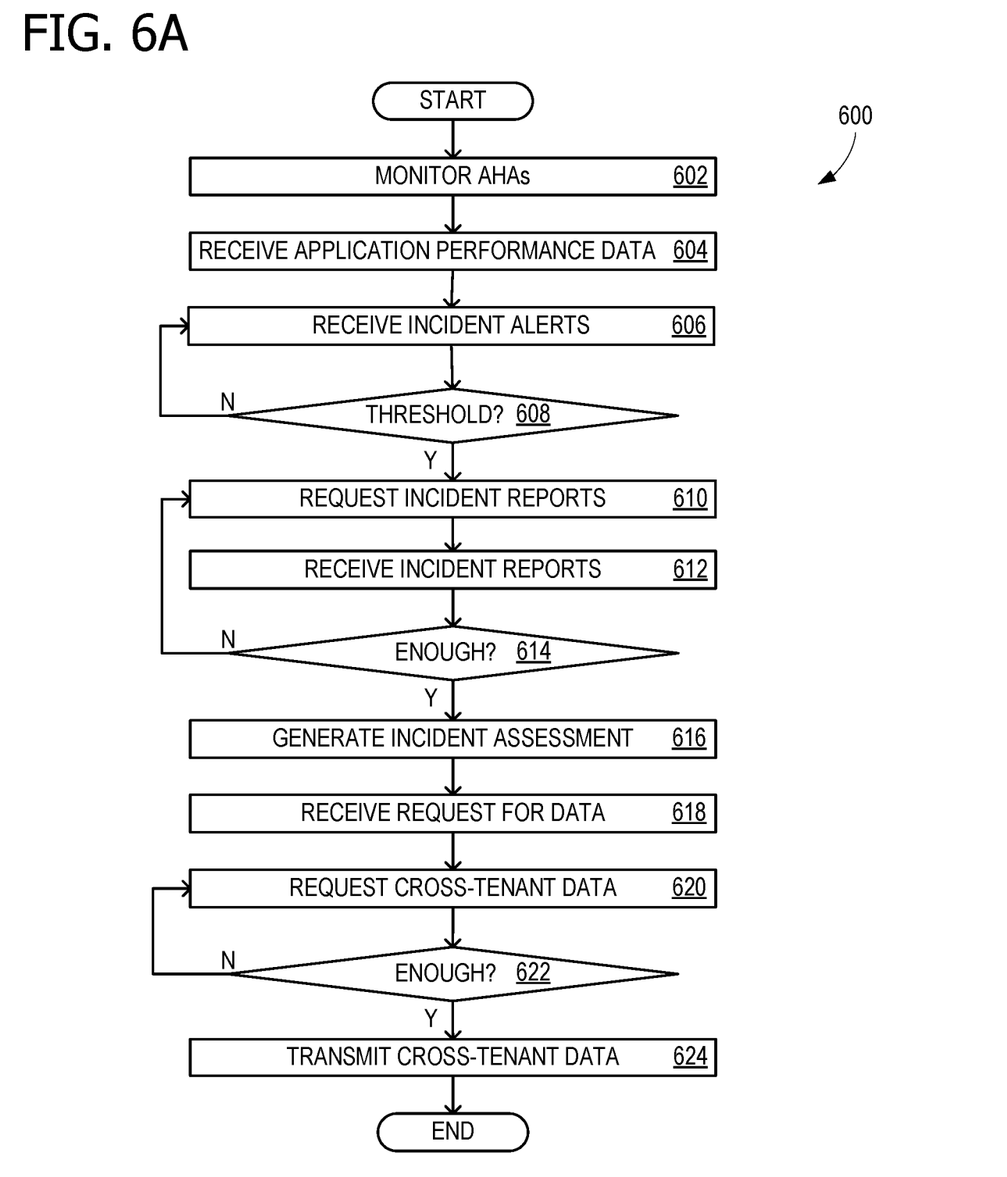
FIG. 6A is a flow chart illustrating exemplary operations involved in intelligent configuration management of user devices.

FIG. 6A is a flow chart 600 illustrating exemplary operations involved in intelligent configuration management of user devices. In some examples, operations described for flow chart 600 are performed by computing device 700 of FIG. 7. Flow chart 600 commences with operation 602, which includes at the first tenant environment, monitoring output of a plurality of AHAs, wherein each AHA of the plurality of AHAs operates on a different user device associated with the first tenant environment. Operation 604 includes receiving, at a first node, application performance data for a plurality of applications from each of a first plurality of tenant environments or cloud services or both, wherein the application performance data includes a first program ID for at least one application of the plurality of applications. In some examples, the program ID for at least one application comprises at least a portion of a hash function message digest for a binary file.

Operation 606 includes receiving, at the first node, incident alerts related to the first program ID from each of a second plurality of tenant environments. In some examples, the incident alerts related to the first program ID comprise application crash alerts. Decision operation 608 includes, based at least on receiving the incident alerts related to the first program ID, determining whether a count of the second plurality of tenant environments meets a threshold. If the count is below the threshold, additional alerts are accumulated. Each program ID has its own count of incident reports. When the count does meet the threshold, operation 610 includes, based at least on the count of the second plurality of tenant environments meeting the threshold, requesting incident reports related to the first program ID from each of a third plurality of tenant environments. The third plurality of tenant environments has a smaller count than the count of the second plurality of tenant environments. In some examples, the incident reports related to the first program ID comprise application crash reports that include diagnostic data. In some examples, the third plurality of tenant environments is within the second plurality of tenant environments.

The incident reports are received in operation 612. Decision operation 614 includes determining whether enough information has been collected about the first program ID to generate an incident report. If not, additional incident reports are requested by returning to operation 610. When enough incident reports have been collected, operation 616 includes generating an incident assessment for the first program ID. The incident assessment includes, for example, a selection of a risk segmentation such as High, Medium, or Low. For example, the incident assessment reflects a preview of an upgrade experience for the first program ID.

Operation 618 includes receiving, from a first tenant environment, a request for data related to at least a second program ID. In some examples, the request for data related to at least the second program ID comprises a request for data regarding at least one data set selected from the list consisting of: applications having updates available, application compatibility, application vulnerability, and information specific to the second program ID. Operation 620 includes, based at least on receiving the request for data related to the second program ID, requesting, from a second node, cross-tenant data related to at least the second program ID. Decision operation 622 includes determining whether enough information has been collected to fulfill the request from the second node. If not, additional information is requested by returning to operation 620. When enough information has been collected, operation 624 includes, based at least on receiving the request for data related to at least the second program ID, transmitting, to the first tenant environment, cross-tenant data related to at least the second program ID.

Figure 6B:
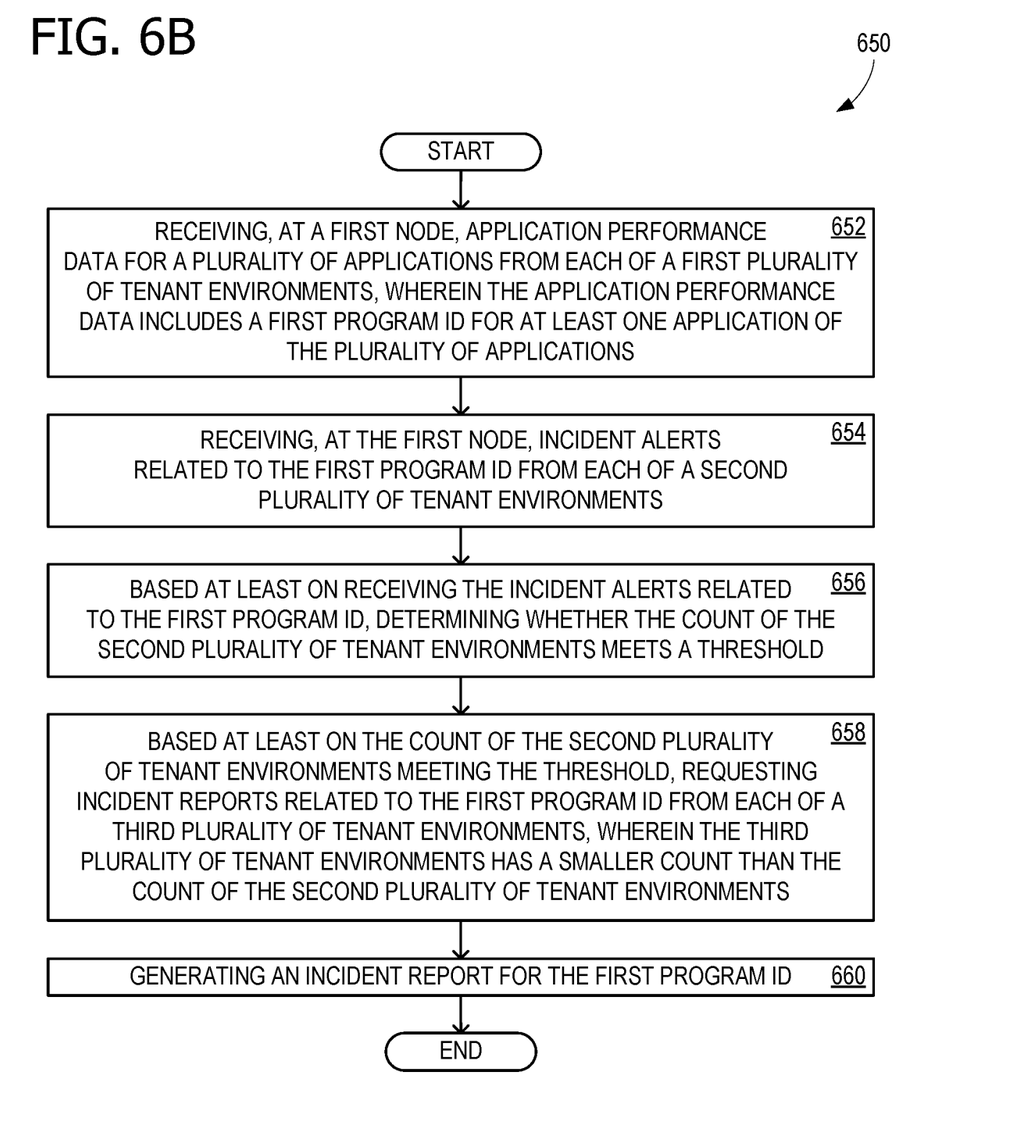
FIG. 6B is another flow chart illustrating exemplary operations involved in intelligent configuration management of user devices.

FIG. 6B is a flow chart 650 illustrating exemplary operations involved in intelligent configuration management of user devices. In some examples, operations described for flow chart 650 are performed by computing device 700 of FIG. 7. Flow chart 650 commences with operation 652, which includes receiving, at a first node, application performance data for a plurality of applications from each of a first plurality of tenant environments or cloud services or both, wherein the application performance data includes a first program ID for at least one application of the plurality of applications. Operation 654 includes receiving, at the first node, incident alerts related to the first program ID from each of a second plurality of tenant environments. Operation 656 includes, based at least on receiving the incident alerts related to the first program ID, determining whether a count of the second plurality of tenant environments meets a threshold. Operation 658 includes, based at least on the count of the second plurality of tenant environments meeting the threshold, requesting incident reports related to the first program ID from each of a third plurality of tenant environments. The third plurality of tenant environments has a smaller count than the count of the second plurality of tenant environments. Operation 660 includes generating an incident assessment for the first program ID.

ADDITIONAL EXAMPLES

Some aspects and examples disclosed herein are directed to a system for intelligent configuration management of user devices comprising: a processor; and a computer-readable medium storing instructions that are operative when executed by the processor to: receive, at a first node, application performance data for a plurality of applications from each of a first plurality of tenant environments or cloud services or both, wherein the application performance data includes a first program ID for at least one application of the plurality of applications; receive, at the first node, incident alerts related to the first program ID from each of a second plurality of tenant environments; based at least on receiving the incident alerts related to the first program ID, determine whether a count of the second plurality of tenant environments meets a threshold; based at least on the count of the second plurality of tenant environments meeting the threshold, request incident reports related to the first program ID from each of a third plurality of tenant environments, wherein the third plurality of tenant environments has a smaller count than the count of the second plurality of tenant environments; and generate an incident assessment for the first program ID.

Additional aspects and examples disclosed herein are directed to a method of intelligent configuration management for user devices comprising: receiving, at a first node, application performance data for a plurality of applications from each of a first plurality of tenant environments or cloud services or both, wherein the application performance data includes a first program ID for at least one application of the plurality of applications; receiving, at the first node, incident alerts related to the first program ID from each of a second plurality of tenant environments; based at least on receiving the incident alerts related to the first program ID, determining whether a count of the second plurality of tenant environments meets a threshold; based at least on the count of the second plurality of tenant environments meeting the threshold, requesting incident reports related to the first program ID from each of a third plurality of tenant environments, wherein the third plurality of tenant environments has a smaller count than the count of the second plurality of tenant environments; and generating an incident assessment for the first program ID.

Additional aspects and examples disclosed herein are directed to one or more computer storage devices having computer-executable instructions stored thereon for intelligent configuration management of user devices, which, on execution by a computer, cause the computer to perform operations comprising: receiving, at a server node, application performance data for a plurality of applications from each of a first plurality of tenant environments or cloud services or both, wherein the application performance data includes a first program ID for at least one application of the plurality of applications; receiving, at the server node, incident alerts related to the first program ID from each of a second plurality of tenant environments; based at least on receiving the incident alerts related to the first program ID, determining whether a count of the second plurality of tenant environments meets a threshold; based at least on the count of the second plurality of tenant environments meeting the threshold, requesting incident reports related to the first program ID from each of a third plurality of tenant environments, wherein the third plurality of tenant environments has a smaller count than the count of the second plurality of tenant environments, and wherein the third plurality of tenant environments is within the second plurality of tenant environments; and generating an incident assessment for the first program ID.

Alternatively, or in addition to the other examples described herein, examples include any combination of the following:
- the program ID for at least one application comprises at least a portion of a hash function message digest for a binary file;
- the incident alerts related to the first program ID comprise application crash alerts, and wherein the incident reports related to the first program ID comprise application crash reports that include diagnostic data;
- the third plurality of tenant environments is within the second plurality of tenant environments;
- receiving, from a first tenant environment, a request for data related to at least a second program ID; based at least on receiving the request for data related to at least the second program ID, transmitting, to the first tenant environment, cross-tenant data related to at least the second program ID;
- the instructions are further operative to: receive, from a first tenant environment, a request for data related to at least a second program ID; and based at least on receiving the request for data related to at least the second program ID, transmit, to the first tenant environment, cross-tenant data related to at least the second program ID;
- based at least on receiving the request for data related to the second program ID, requesting, from a second node, at least a portion of the cross-tenant data related to at least the second program ID;
- the instructions are further operative to: based at least on receiving the request for data related to the second program ID, request, from a second node, at least a portion of the cross-tenant data related to at least the second program ID;
- at the first tenant environment, monitoring output of a plurality of AHAs, wherein each AHA of the plurality of AHAs operates on a different user device associated with the first tenant environment;

the instructions are further operative to: at the first tenant environment, monitor output of a plurality of AHAs, wherein each AHA of the plurality of AHAs operates on a different user device associated with the first tenant environment;

the request for data related to at least the second program ID comprises a request for data regarding at least one data set selected from the list consisting of: applications having updates available, application compatibility, application vulnerability, and information specific to the second program ID; and the operations further comprise: at a first tenant environment, monitoring output of a plurality of AHAs, wherein each AHA of the plurality of AHAs operates on a different user device associated with the first tenant environment; receiving, from the first tenant environment, a request for data related to at least a second program ID, wherein the request for data related to at least the second program ID comprises a request for data regarding at least one data set selected from the list consisting of: applications having updates available, application compatibility, application vulnerability, and information specific to the second program ID; based at least on receiving the request for data related to the second program ID, requesting, from a second node, cross-tenant data related to at least the second program ID; and based at least on receiving the request for data related to at least the second program ID, transmitting, to the first tenant environment, cross-tenant data related to at least the second program ID.

While the aspects of the disclosure have been described in terms of various examples with their associated operations, a person skilled in the art would appreciate that a combination of operations from any number of different examples is also within scope of the aspects of the disclosure.

Example Operating Environment

Figure 7:
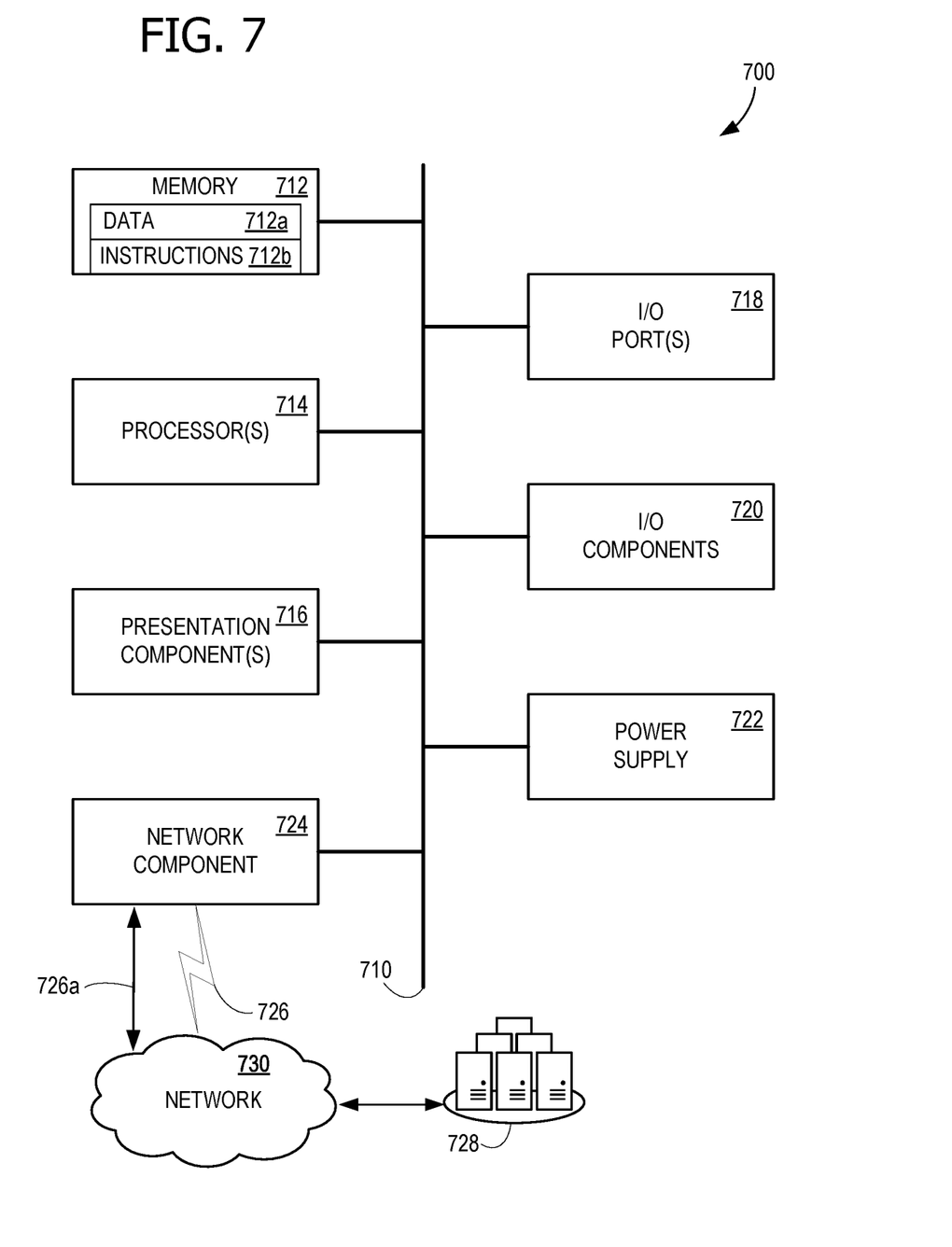
FIG. 7 is a block diagram of an example computing environment suitable for implementing some of the various examples disclosed herein.

FIG. 7 is a block diagram of an example computing device 700 for implementing aspects disclosed herein, and is designated generally as computing device 700. Computing device 700 is but one example of a suitable computing environment and is not intended to suggest any limitation as to the scope of use or functionality of the examples disclosed herein. Neither should computing device 700 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 700 includes a bus 710 that directly or indirectly couples the following devices: computer-storage memory 712, one or more processors 714, one or more presentation components 716, I/O ports 718, I/O components 720, a power supply 722, and a network component 724. While computing device 700 is depicted as a seemingly single device, multiple computing devices 700 may work together and share the depicted device resources. For example, memory 712 may be distributed across multiple devices, and processor(s) 714 may be housed with different devices.

Bus 710 represents what may be one or more busses (such as an address bus, data bus, or a combination thereof). Although the various blocks of FIG. 7 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 7 and the references herein to a "computing device." Memory 712 may take the form of the computer-storage media references below and operatively provide storage of computer-readable instructions, data structures, program modules and other data for the computing device 700. In some examples, memory 712 stores one or more of an operating system, a universal application platform, or other program modules and program data. Memory 712 is thus able to store and access data 712a and instructions 712b that are executable by processor 714 and configured to carry out the various operations disclosed herein.

In some examples, memory 712 includes computer-storage media in the form of volatile and/or nonvolatile memory, removable or non-removable memory, data disks in virtual environments, or a combination thereof. Memory 712 may include any quantity of memory associated with or accessible by the computing device 700. Memory 712 may be internal to the computing device 700 (as shown in FIG. 7), external to the computing device 700 (not shown), or both (not shown). Examples of memory 712 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 700. Additionally, or alternatively, the memory 712 may be distributed across multiple computing devices 700, for example, in a virtualized environment in which instruction processing is carried out on multiple devices 700. For the purposes of this disclosure, "computer storage media," "computer-storage memory," "memory," and "memory devices" are synonymous terms for the computer-storage memory 712, and none of these terms include carrier waves or propagating signaling.

Processor(s) 714 may include any quantity of processing units that read data from various entities, such as memory 712 or I/O components 720. Specifically, processor(s) 714 are programmed to execute computer-executable instructions for implementing aspects of the disclosure. The instructions may be performed by the processor, by multiple processors within the computing device 700, or by a processor external to the client computing device 700. In some examples, the processor(s) 714 are programmed to execute instructions such as those illustrated in the flow charts discussed below and depicted in the accompanying drawings. Moreover, in some examples, the processor(s) 714 represent an implementation of analog techniques to perform the operations described herein. For example, the operations may be performed by an analog client computing device 700 and/or a digital client computing device 700. Presentation component(s) 716 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 700, across a wired connection, or in other ways. I/O ports 718 allow computing device 700 to be logically coupled to other devices including I/O components 720, some of which may be built in. Example I/O components 720 include, for example but without limitation, a microphone, joystick, game pad, satellite dish, scanner, printer, wireless device, etc.

The computing device 700 may operate in a networked environment via the network component 724 using logical connections to one or more remote computers. In some examples, the network component 724 includes a network interface card and/or computer-executable instructions (e.g., a driver) for operating the network interface card. Communication between the computing device 700 and other devices may occur using any protocol or mechanism over any wired or wireless connection. In some examples, network component 724 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 724 communicates over wireless communication link 726 and/or a wired communication link 726a to a cloud resource 728 across network 730. Various different examples of communication links 726 and 726a include a wireless connection, a wired connection, and/or a dedicated link, and in some examples, at least a portion is routed through the internet.

Although described in connection with an example computing device 700, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for intelligent configuration management of user devices, the system comprising:
   a processor; and
   a computer-readable medium storing instructions that are operative when executed by the processor to:
      receive, at a first node, application performance data for a plurality of applications from each of a first plurality of tenant environments or cloud services or both, wherein the application performance data includes a first program identifier (ID) for at least one application of the plurality of applications;
      receive, at the first node, incident alerts related to the first program ID from each of a second plurality of tenant environments;
      based at least on receiving the incident alerts related to the first program ID, determine whether a count of the second plurality of tenant environments meets a threshold;
      based at least on the count of the second plurality of tenant environments meeting the threshold, request incident reports related to the first program ID from each of a third plurality of tenant environments, wherein the third plurality of tenant environments has a smaller count than the count of the second plurality of tenant environments; and
      generate an incident assessment for the first program ID based at least on the incident reports from the third plurality of tenant environments.

2. The system of claim 1, wherein the program ID for at least one application comprises at least a portion of a hash function message digest for a binary file.

3. The system of claim 1, wherein the incident alerts related to the first program ID comprise application crash alerts, and wherein the incident reports related to the first program ID comprise application crash reports that include diagnostic data.

4. The system of claim 1, wherein the third plurality of tenant environments is within the second plurality of tenant environments.

5. The system of claim 1, wherein the instructions are further operative to:
   receive, from a first tenant environment, a request for data related to at least a second program ID; and
   based at least on receiving the request for data related to at least the second program ID, transmit, to the first tenant environment, cross-tenant data related to at least the second program ID.

6. The system of claim 5, wherein the instructions are further operative to:
   based at least on receiving the request for data related to the second program ID, request, from a second node, at least a portion of the cross-tenant data related to at least the second program ID.

7. The system of claim 5, wherein the instructions are further operative to:
   at the first tenant environment, monitor output of a plurality of application health analyzers (AHAs), wherein each AHA of the plurality of AHAs operates on a different user device associated with the first tenant environment.

8. The system of claim 5, wherein the request for data related to at least the second program ID comprises a request for data regarding at least one data set selected from the list consisting of:
   applications having updates available, application compatibility, application vulnerability, and information specific to the second program ID.

9. A method of intelligent configuration management for user devices, the method comprising:
   receiving, at a first node, application performance data for a plurality of applications from each of a first plurality of tenant environments or cloud services or both, wherein the application performance data includes a first program identifier (ID) for at least one application of the plurality of applications;
   receiving, at the first node, incident alerts related to the first program ID from each of a second plurality of tenant environments;
   based at least on receiving the incident alerts related to the first program ID, determining whether a count of the second plurality of tenant environments meets a threshold;
   based at least on the count of the second plurality of tenant environments meeting the threshold, requesting incident reports related to the first program ID from each of a third plurality of tenant environments, wherein the third plurality of tenant environments has a smaller count than the count of the second plurality of tenant environments; and
   generating an incident assessment for the first program ID based at least on the incident reports from the third plurality of tenant environments.

10. The method of claim 9, wherein the program ID for at least one application comprises at least a portion of a hash function message digest for a binary file.

11. The method of claim 9, wherein the incident alerts related to the first program ID comprise application crash alerts, and wherein the incident reports related to the first program ID comprise application crash reports that include diagnostic data.

12. The method of claim 9, wherein the third plurality of tenant environments is within the second plurality of tenant environments.

13. The method of claim 9, further comprising:
   receiving, from a first tenant environment, a request for data related to at least a second program ID; and
   based at least on receiving the request for data related to at least the second program ID, transmitting, to the first tenant environment, cross-tenant data related to at least the second program ID.

14. The method of claim 13, further comprising:
   based at least on receiving the request for data related to the second program ID, requesting, from a second node, at least a portion of the cross-tenant data related to at least the second program ID.

15. The method of claim 13, further comprising:
   at the first tenant environment, monitoring output of a plurality of application health analyzers (AHAs), wherein each AHA of the plurality of AHAs operates on a different user device associated with the first tenant environment.

16. The method of claim 13, wherein the request for data related to at least the second program ID comprises a request for data regarding at least one data set selected from the list consisting of:

applications having updates available, application compatibility, application vulnerability, and information specific to the second program ID.

17. One or more computer storage devices having computer-executable instructions stored thereon for intelligent configuration management of user devices, which, on execution by a computer, cause the computer to perform operations comprising:
   receiving, at a server node, application performance data for a plurality of applications from each of a first plurality of tenant environments or cloud services or both, wherein the application performance data includes a first program identifier (ID) for at least one application of the plurality of applications;
   receiving, at the server node, incident alerts related to the first program ID from each of a second plurality of tenant environments;
   based at least on receiving the incident alerts related to the first program ID, determining whether a count of the second plurality of tenant environments meets a threshold;
   based at least on the count of the second plurality of tenant environments meeting the threshold, requesting incident reports related to the first program ID from each of a third plurality of tenant environments, wherein the third plurality of tenant environments has a smaller count than the count of the second plurality of tenant environments, and wherein the third plurality of tenant environments is within the second plurality of tenant environments; and
   generating an incident assessment for the first program ID based at least on the incident reports from the third plurality of tenant environments.

18. The one or more computer storage devices of claim 17, wherein the program ID for at least one application comprises at least a portion of a hash function message digest for a binary file.

19. The one or more computer storage devices of claim 17, wherein the incident alerts related to the first program ID comprise application crash alerts, and wherein the incident reports related to the first program ID comprise application crash reports that include diagnostic data.

20. The one or more computer storage devices of claim 17, wherein the operations further comprise:
   at a first tenant environment, monitoring output of a plurality of application health analyzers (AHAs), wherein each AHA of the plurality of AHAs operates on a different user device associated with the first tenant environment;
   receiving, at the server node, from the first tenant environment, a request for data related to at least a second program ID, wherein the request for data related to at least the second program ID comprises a request for data regarding at least one data set selected from the list consisting of:
      applications having updates available, application compatibility, application vulnerability, and information specific to the second program ID;
   based at least on receiving the request for data related to the second program ID, requesting, from a second node, cross-tenant data related to at least the second program ID; and
   based at least on receiving the request for data related to at least the second program ID, transmitting, to the first tenant environment, cross-tenant data related to at least the second program ID.

* * * * *